(12) United States Patent
Buday et al.

(10) Patent No.: US 8,253,069 B2
(45) Date of Patent: Aug. 28, 2012

(54) SLIDEABLE WELDING POWER SOURCE HOUSING ASSEMBLY

(75) Inventors: Jeremie Buday, Mentor, OH (US); George Koprivnak, Painesville, OH (US); Robert Dodge, Mentor, OH (US); David Perrin, Wadsworth, OH (US)

(73) Assignee: Lincoln Global, Inc., City of Industry, CA (US)

( * ) Notice: Subject to any disclaimer, the term of this patent is extended or adjusted under 35 U.S.C. 154(b) by 381 days.

(21) Appl. No.: 12/723,987

(22) Filed: Mar. 15, 2010

(65) Prior Publication Data

US 2011/0220627 A1  Sep. 15, 2011

(51) Int. Cl.
*B23K 9/10* (2006.01)

(52) U.S. Cl. .................. 219/130.1; 219/137 PS

(58) Field of Classification Search .............. 219/130.1, 219/86.31, 137 PS, 137.62, 385, 478, 520, 219/660

See application file for complete search history.

(56) References Cited

U.S. PATENT DOCUMENTS

| | | | |
|---|---|---|---|
| 5,562,410 A | 10/1996 | Sachs et al. | |
| 5,642,260 A | 6/1997 | Sigl | |
| 5,747,773 A | 5/1998 | Griffin et al. | |
| 5,951,132 A * | 9/1999 | Cirocco ................. | 312/334.46 |
| 6,075,698 A | 6/2000 | Hogan et al. | |
| 6,081,423 A | 6/2000 | Griffin | |
| 6,316,718 B1 | 11/2001 | Lin | |
| 6,489,591 B1 * | 12/2002 | Achtner ................ | 219/130.1 |
| 6,596,972 B1 | 7/2003 | Di Novo et al. | |
| 6,888,099 B1 | 5/2005 | Schneider | |
| 7,005,608 B2 | 2/2006 | Spear | |
| 7,456,373 B2 | 11/2008 | Andersen et al. | |
| 2003/0136773 A1 * | 7/2003 | Bogner et al. ............... | 219/136 |
| 2006/0043081 A1 * | 3/2006 | Martin et al. .............. | 219/130.1 |
| 2006/0102693 A1 | 5/2006 | Bender et al. | |
| 2008/0061047 A1 | 3/2008 | Borowy et al. | |

FOREIGN PATENT DOCUMENTS

| | | |
|---|---|---|
| CN | 2741707 | 11/2005 |
| CN | 2932472 Y | 8/2007 |
| CN | 101546209 A | 9/2009 |
| EP | 1 515 412 | 3/2005 |
| EP | 1629926 A2 | 3/2006 |
| JP | 06-113486 | 4/1994 |
| JP | 2003-273559 | 9/2003 |
| JP | 2006-344661 | 12/2006 |

OTHER PUBLICATIONS

International Search Report for application PCT/IB2011/000529 dated Jul. 15, 2011.
Written Opinion for International Search Report for application PCT/IB2011/000529 dated Jul. 15, 2011.

* cited by examiner

*Primary Examiner* — Tan T. Nguyen
(74) *Attorney, Agent, or Firm* — Hahn Loeser & Parks LLP

(57) ABSTRACT

An electric arc welder power supply housing assembly is described in which it is possible to clean internal component parts is achieved by positioning cooling components on a rail system. The rail system may include at least one telescoping track assembly. When the telescoping track assembly is engaged, the housing assembly is in an open position, thus providing access for the maintenance of internal components therein without having to disassemble unnecessary components or parts of the welding power supply.

20 Claims, 6 Drawing Sheets

SLIDEABLE WELDING POWER SOURCE HOUSING ASSEMBLY

TECHNICAL FIELD

The present invention pertains to welding power supplies and more particularly to providing a housing assembly having an access panel and a telescoping track assembly with sliding or rolling attributes thus providing access to the internal components of the welding power supplies for maintenance.

BACKGROUND OF THE INVENTION

The power supply of an arc welder or a plasma arc torch typically includes an input line that is connected to a conventional supply of electric power, such as household or industrial alternating current. The power supply also includes multiple output terminals. One of the terminals is electrically connected to an anode, such as by way of an electrode holder, and the other of the terminals is connected to the workpiece to produce an electric arc between the anode and the workpiece. The power supply typically includes a housing assembly that contains the various electrical components of the power supply therein. The housing typically includes one or more cover panels that shield the electrical components from the operator and the environment.

Some of the electrical components of the power supply can generate large amounts of heat. Accordingly, many conventional power supplies include thermal cooling devices mounted within the housing to cool the electrical components. The environment within which these types of machines are typically used, consist of many large and small air contaminants. These contaminants are then captured by the air intake and accelerated into the machine. The particles collide with the thermal cooling devices and adhere to the leading edges. Over time these contaminants accumulate on these leading edges and reduce air flow over the thermal cooling device resulting in reducing cooling capacity. The electrical components may also accumulate contaminants or cease to function over time, thereby requiring service or replacement.

Traditionally, repair, replacement or maintenance of these cooling devices required that the power supply housing would be disassembled. However, disassembly of the power supply may require multiple components within the power supply to be removed in order to access the cooling devices and other devices that require some type of maintenance. The removal of these additional assemblies increases service time and increases the possibility of damage to the parts being handled. Additionally, the connections to the sub-assemblies may require access to the sides of the equipment to disconnect related plug(s). These traditional means lead many users to forget these connections and potentially damaging the internal components during the reassembly process.

It is thus desirable to provide a power supply housing assembly having a sliding attribute that allows for access of the internal components throughout the power supply with minimal effort.

SUMMARY OF THE INVENTION

In accordance with the present invention, there is provided an electric arc welder power supply having an airflow with contaminants embedded within the airflow, the power supply including: an essentially hollow housing; at least one internal component requiring cooling mounted within the hollow housing; at least one cooling component mounted within the hollow housing; at least one sliding track assembly (preferably telescoping) within the housing and attached thereto, the sliding track assembly having said at least one cooling component mounted thereupon; and wherein the sliding track assembly moves from a first closed position to a second open position which at least partially exposes the at least one cooling component.

In one embodiment, the welder power supply will further include an access panel attached to an end of the track assembly. In an alternate embodiment, the access panel is pivotally attached to a vertical edge of the housing.

In another embodiment, the sliding track assembly will be a pair of essentially parallel sliding track assemblies, on a pair of essentially parallel rails. The welder power supply may further include at least two pairs of essentially parallel sliding track assemblies.

In yet another embodiment, the welder power supply will further include at least a second sliding track assembly within the housing and attached thereto, the second sliding track assembly moving from a first closed position to a second open position through either a front side or lateral side of the housing for maintaining internal components therein.

The invention additional includes a method for accessing and maintaining internal components of an electric arc welding power supply including the following steps: providing a welding power supply housing which allows airflow therethrough; providing at least one sliding track assembly within the housing and attached thereto, the sliding track assembly having at least one cooling component mounted thereupon; and wherein engaging the sliding track assembly from a first closed position to a second open position which at least partially exposes the at least one cooling component for cleaning thereof. Additionally, the method further includes the steps of providing a second sliding track assembly within the housing and attached thereto, the second sliding track assembly having at least one electrical internal component mounted thereupon; and wherein engaging the second sliding track assembly from a first closed position to a second open position at least partially exposes the at least one electrical internal component thereof.

DETAILED DESCRIPTION OF THE INVENTION

Figure 1:
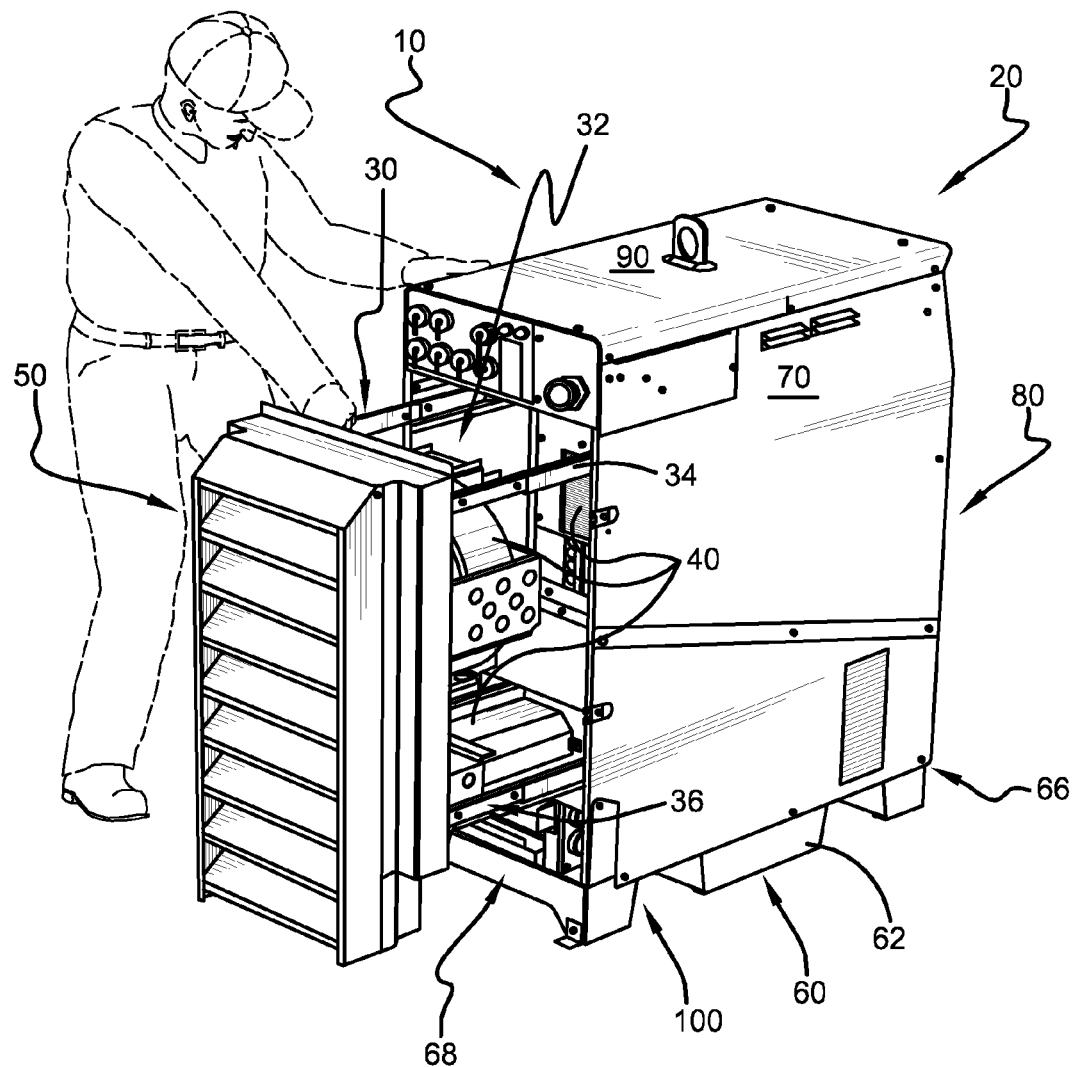
FIG. 1 is a rear perspective view of a power supply housing assembly in a second open position in accordance with an embodiment of the present invention and shown with internal assemblies therein, and an access panel having a sub-assembly selectively attached thereon.

The best mode for carrying out the invention will now be described for the purposes of illustrating the best mode known to the applicant at the time of filing this application.

The examples and drawings are illustrative only and not meant to limit the invention as measured by the scope and spirit of the claims.

Referring now to the drawings wherein the showings are for purposes of illustrating embodiments of the invention only and not for purposes of limiting the same. Generally disclosed within the figures are welding power supplies having an access panel on a telescoping tracking assembly that allows users to access internal sub-assemblies or components contained within the welding power supply without having to disassemble unnecessary parts of the welding power supplies or internal components. The welding power supply described hereafter is exemplary in nature, and persons of ordinary skill in the art will readily understand the application of the embodiments of the subject invention to any type of welding power source including both DC and AC output power as well as switched mode power supplies. Welding processes may include stick welding, submerged arc welding (SAW), gas metal arc welding (GMAW), gas tungsten arc welding (GTAW), laser welding and the like. The welding power supply illustrated in the figures is illustrative of a switching inverter and is not intended to be limiting in any way.

FIG. 1 shows a welding power supply housing assembly generally at 10. In this embodiment, welding power supply housing assembly 10 includes housing assembly 20 capable of allowing airflow therethrough; at least one internal component 40 within housing assembly 20 which is operational with a welding process; at least one sliding, preferably also telescoping, track assembly 30; and access panel 50. Housing assembly 20 or access panel 50 may be constructed from a rigid metallic material such as iron, steel, stainless steel, aluminum, or a rigid reinforced polymeric material, such as high density polyolefins, preferably polyethylenes, more preferably crosslinked polyethylenes (e.g., PEX), polyamides, polyimides, polyvinyl chloride, polyesters, e.g., reinforced polyethylene terephthalate (PET), etc., or any other material known to a person of ordinary skill in the art, chosen with sound engineering judgment, and capable of housing at least one internal component 40.

With continued reference to the figures, the at least one internal component 40 may include a/c switches, impeller fans, heat sinks, thermal cooling devices or the like, capacitors, resistors, control boards, or any other mechanical or electrical component for welding operations known to a person of ordinary skill in the art, and chosen with sound engineering judgment.

Figure 2:
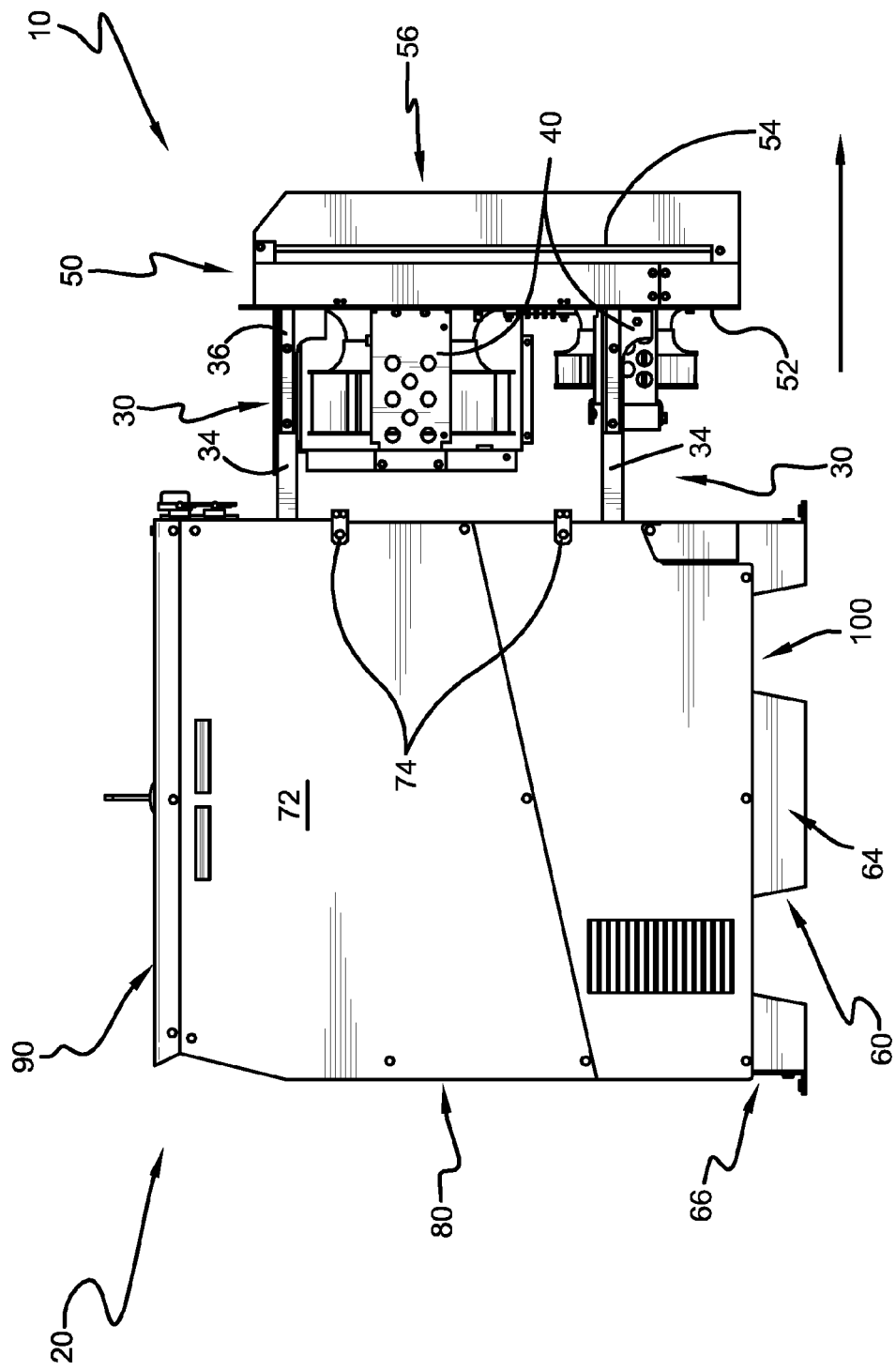
FIG. 2 is a side elevational view of a power supply housing assembly in accordance with an embodiment of the present invention and shown with an access panel having a sub-assembly selectively attached thereon.

With continued reference to FIG. 1 and now FIG. 2, in one embodiment, housing assembly 20 of welding power supply housing assembly 10 includes base panel 60, having pair of side edges opposite one another 62 and 64, front edge 66, and rear edge 68 opposite front edge 66. Welding power supply housing assembly 10 further includes a pair of parallelly opposed side panels 70, and 72, both extending substantially perpendicularly from side edges 62 and 64 of base panel 60. Assembly 10 further includes front panel 80 which extends substantially perpendicularly from front edge 66 of base panel 60, top panel 90 opposite and parallel to base panel 60 connecting the uppermost edges of the pair of side panels 70 and 72, and front panel 80, thus forming a hollow space for installing at least one internal component 40 therein. In the embodiment disclosed herein the elements that make up the welding power supply housing assembly may be fastened by screws, nuts and bolts, clips, rivets, welding process, or any other fastener or fastening techniques used by a person of ordinary skill in the art and chosen with sound engineering judgment.

Alternatively, in another non limiting embodiment, housing assembly 20 may be a unitary molded component having a hollow space therein, or combinations of panels joined to form a housing assembly having a hollow space therein. Housing assembly 20 typically serves as a means to protect the at least one internal component 40 installed therein from users of the welding power supply, as well as other objects (i.e. contaminants) not beneficial to the welding operation.

With continued reference to FIGS. 1 & 2, in yet a further non limiting embodiment, base panel 60 or lowermost portion defined by unitary molded housing assembly 20 further includes at least one movement support 100. Said at least one movement support 100 defines a channel extending at least partially from side edge 62 to side edge 64. The channel may have at least 3 borders, conform to a trapezoid shape, or conform to any other shape capable of providing a passthrough for moving an arc welding power supply known by a person of ordinary skill in the art and chosen with sound engineering judgment.

With continued reference to FIGS. 1 & 2, sliding (and preferably telescoping) track assembly 30 may be a single rail track system, preferably a two rail sliding track system, or more preferably a three rail sliding track system which includes first rail member 32, intermediate rail member 34, and second rail member 36 reciprocally movable along a longitudinal axis of housing assembly 10. Intermediate rail member 34 is slidably mounted between first rail member 32 and second rail member 36. A ball bearing (not shown) may be provided between any two (or all) of the rails to facilitate reciprocal sliding therebetween. Telescoping track assembly 30 is preferably constructed from a rigid metallic material such as steel, stainless steel, iron, aluminum, although depending upon the weight of the component positioned between the rail system, a rigid reinforced polymeric material may be used, such as high density polyolefins preferably polyethylene, more preferably cross-linked polyethylene (i.e., PEX), polyamides, polyimides, polyvinyl chloride, polyesters, e.g., reinforced polyethylene terephthalate (PET), Teflon®, etc., or any other material known to a person of ordinary skill in the art, chosen with sound engineering judgment, and capable of being slidably engaging, and capable of withstanding the weight of the at least one internal component 40.

In its simplest form, telescoping track assembly 30 requires at least one rail, more preferably a pair of rails, most preferably two pairs of rails, two of which may be attached to side panel 70 and the other two may be attached to the side panel 72. Telescoping track assemblies 30 may be attached to the pair of side panels 70, 72 by fasteners such as screws, nuts and bolts, welding process, clips, rivets, or by any other means known to a person having ordinary skill in the art, and chosen with sound engineering judgment. The position of the two telescoping track assemblies 30 on each side panel may be parallel to one another and substantially on the same vertical axis, thus defining an upper and lower telescoping track assembly 30. Additionally, the upper telescoping track assemblies 30 on the pair of side panels 70, 72 may be on the same vertical plane. Further, the lower telescoping track assemblies 30 of the pair of side panels 70, 72 may be on the same vertical plane. However, it should be appreciated that position of the telescoping track assemblies 30 on the pair of side panels 70, 72 may be on a different vertical plane with respect to one another. Alternatively, any number of telescoping track assemblies 30 may be attached to housing assembly 20. For example, in another embodiment, one telescoping track assembly 30 may be attached to top panel 90 or base panel 60, thereby permitting sliding in-and-out movement of the internal components, in order to facilitate the access to the at least one internal component 40 mounted within the welding power supply housing assembly 10.

Figure 3:
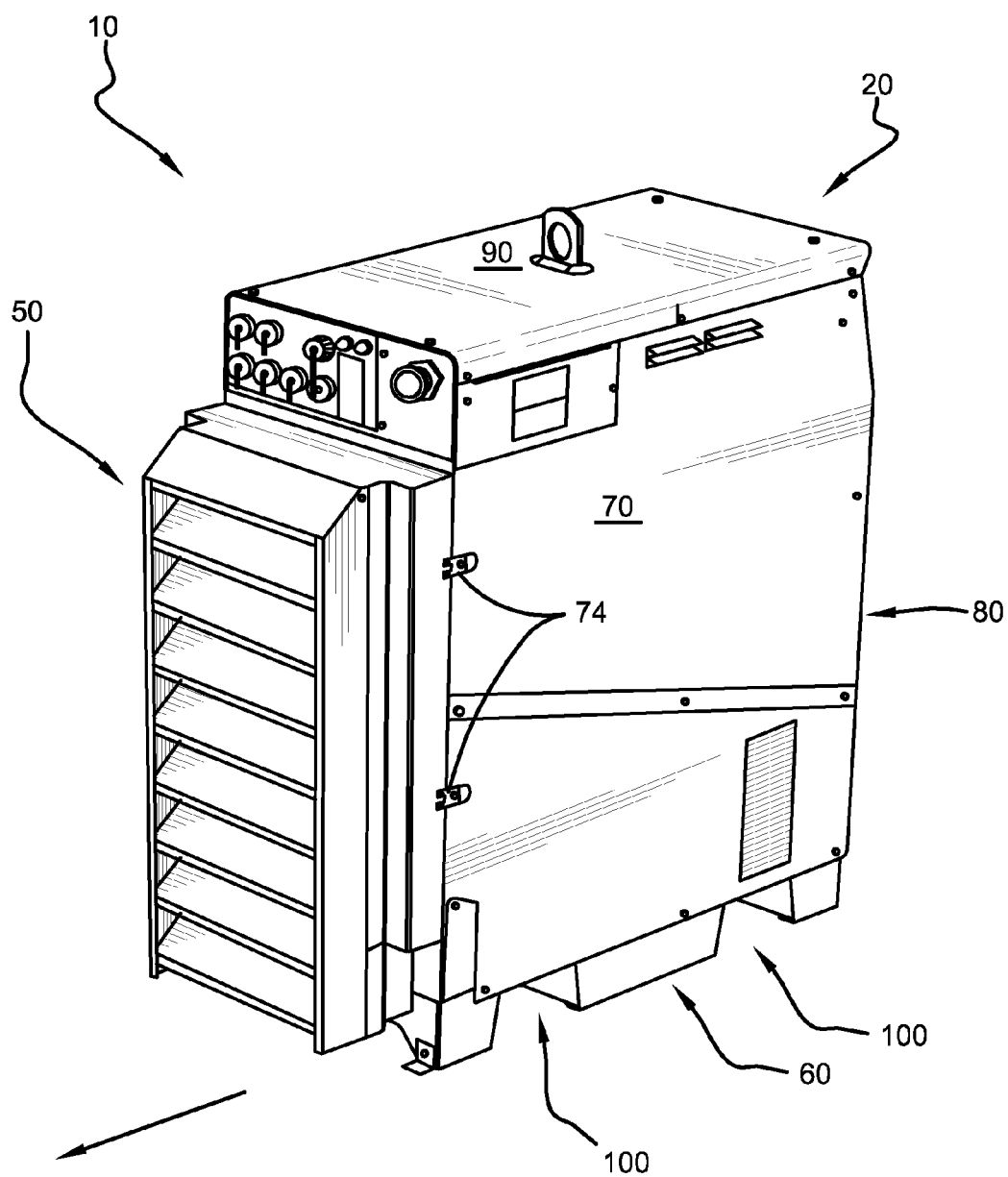
FIG. 3 is a rear perspective view of the power supply housing assembly shown in FIG. 1 in a first closed position.

With continued reference to FIGS. 1 & 2, access panel 50 of welding power supply assembly 10 includes first side 52, and second side 54. In one embodiment, first side 52 is attached to second rail member 36 of telescoping track assembly 30 using a fastening means. In operation, welding power supply housing assembly 10 is in an open or closed position once access panel 50 is moved and telescoping track assembly 30 begins to engage. For example, in operation, telescoping track assembly 30 may facilitate the sliding of access panel 50 into a second open position, thus providing access to the at least one internal component 40 which may be selectively attached within housing assembly 20. Additionally, telescoping track assembly 30 may facilitate the sliding of access panel 50 towards front panel 80, resulting in welding power supply housing assembly 10 in a closed position as illustrated in FIG. 3. In a closed position, second rail member 36 and intermediate rail member 34 may be received by the first rail member 32, wherein first side 52 of access panel 50 may seal the welding power supply housing assembly 10, thus protecting the at least one internal component 40 mounted therein from contaminants not produced during power supply operation (i.e. water, dust). In the closed position, access panel 50 may optionally be secured to housing assembly 20 using securing clips 74, or by other securing means known to a person of ordinary skill in the art, using sound engineering judgment, and capable of securing a panel to a housing. In yet a further embodiment, access panel 50 may include a seal (not shown) fastened to first side 52. In this configuration, and when welding power supply housing assembly 10 is in the closed position, the seal may contact housing assembly 20 instead of first side 52 of access panel 50. In another embodiment, when more than one telescoping track assembly 30 is used, second rail member 36 of each telescoping track assembly 30 is attached to first side 52 of access panel 50 in a position relative to its first rail member 32 that is attached to housing assembly 20. It is appreciated that alternatively, first rail member 32 may be attached to access panel 50 instead of second rail member 36 without changing the scope of the present invention. The function of moving welding power supply housing 10 into an open or closed position using telescoping track assembly 30 additionally remains the same regardless of which end is attached to housing assembly 20 or access panel 50. Telescoping track assembly 30 as a whole may facilitate the position change of welding power supply housing 10.

With continued reference to FIGS. 1 & 2, in yet further non-limiting embodiment, at least one internal component 40 is selectively attached to first surface 52 of access panel 50. For example, in SAW, the internal component may be a backward curved impeller, which is preferably attached to access panel 50, thereby dissipating heat produced during operation. An advantage of selectively attaching an impeller to access panel 50 is it allows for minimal spacing between components within welding power supply housing assembly 10, and better handles pressure.

In another non-limiting embodiment, access panel 50 may further include a pair of side edges (not shown). In this embodiment, telescoping track assembly 30 is attached to the pair of side edges of access panel 50 instead of first side 52 as discussed previously. Additionally, access panel 50 may be constructed from the rigid materials described above, but may further include an access panel casing (not shown) constructed from a thinner rigid metallic material such as steel, stainless steel, iron, aluminum, or a rigid reinforced polymeric material, such as high density polyolefins preferably polyethylene, more preferably cross-linked polyethylene (i.e., PEX), polyamides, polyimides, polyvinyl chloride, polyesters, e.g., reinforced polyethylene terephthalate (PET), etc., or other material known to a person having ordinary skill in the art, and using sound engineering judgment. When access panel 50 includes access panel casing, access panel casing may be constructed from the same or a different material than that of access panel 50.

With continued reference to the figures, and in yet a further non-limiting embodiment, the housing assembly 10 includes filter assembly 56, which is selectively attached to second side 54 of access panel 50. Filter assembly 56 provides a housing for a filter (not shown) which is used by the welding power supply. The filter may be easily placed in a slot or other housing means of filter assembly 56 without the use of tools or any additional assembly.

Figure 4:
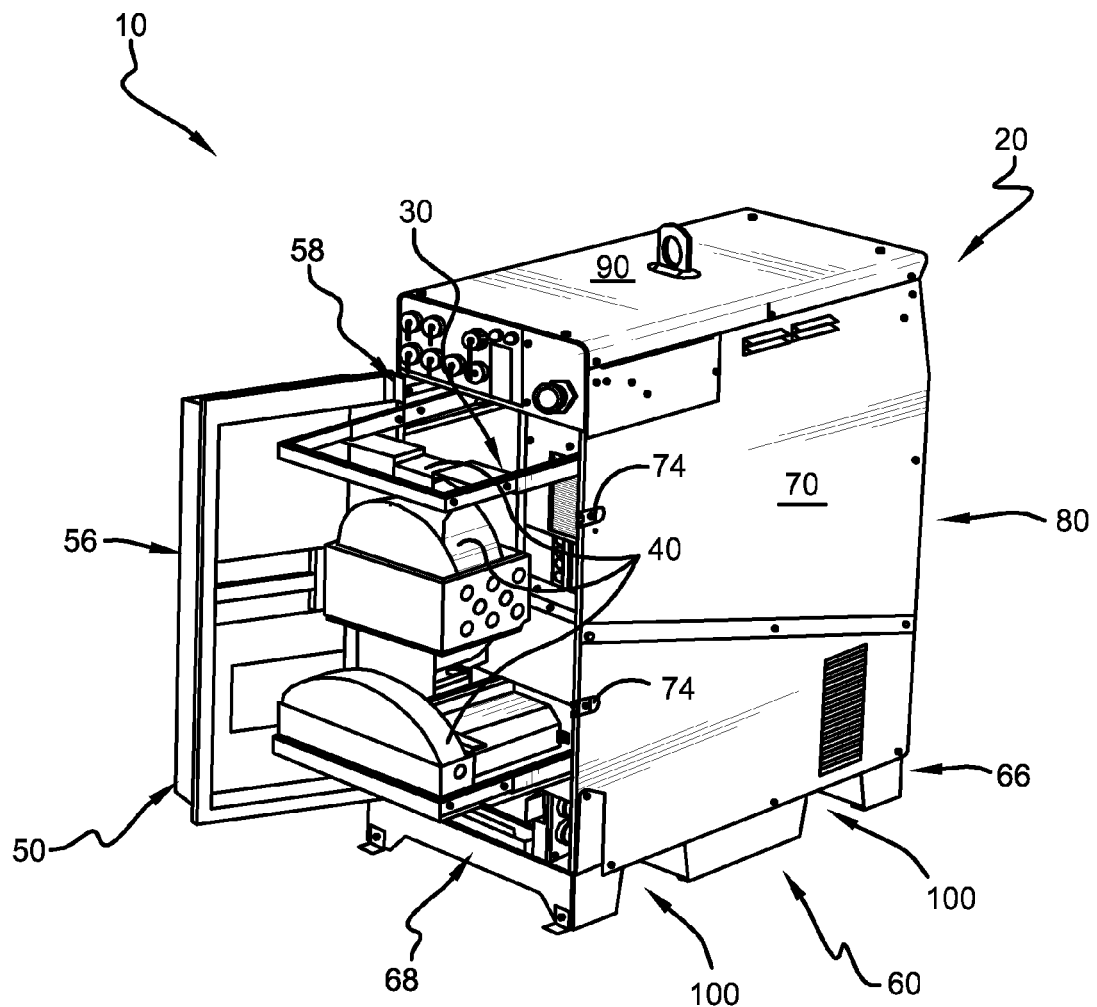
FIG. 4 is a perspective view of yet a further embodiment of the power supply housing assembly having an access panel pivotally attached.

With reference to FIG. 4, in yet a further non-limiting embodiment, access panel 50 may be pivotally attached to a side of welding power supply housing assembly 10 using at least one pivoting member 58. Pivoting members may include a friction hinge, double action hinge, single action hinge, tee hinge, flush hinge, continuous hinge, butt hinge, security butt hinge, rising butt hinge or by any means known to a person of ordinary skill in the art, using sound engineering judgment, and capable of pivoting and withstanding the weight of access panel 50. In this embodiment, the at least one internal component 40 is preferably selectively mounted to the at least one telescoping track assembly 30. For example, when welding power supply housing assembly 10 in an open position by opening access panel 50, a user may access the at least one internal component 40 by sliding telescoping track assembly 30 outwardly from housing assembly 20 after pivotally opening access panel 50.

In yet a further non-limiting embodiment, welding power supply housing assembly 10 may further comprise an inner housing assembly frame (not shown) within housing assembly 20. In this embodiment, the at least one telescoping tracking assembly 30 may be selectively attached to the housing frame within housing assembly 20. The housing frame may be constructed from a rigid metallic material such as stainless steel, steel, iron, or a rigid reinforced polymeric material, such as high density polyolefins, preferably polyethylene, more preferably cross-linked polyethylene (i.e., PEX), polyamides, polyimides, polyvinyl chloride, polyesters, e.g., reinforced polyethylene terephthalate (PET), etc., or any other rigid material known to a person of ordinary skill in the art, using sound engineering judgment, and capable of withstanding the weight of the at least one internal component 40 and at least one telescoping track assembly 30.

Figure 5:
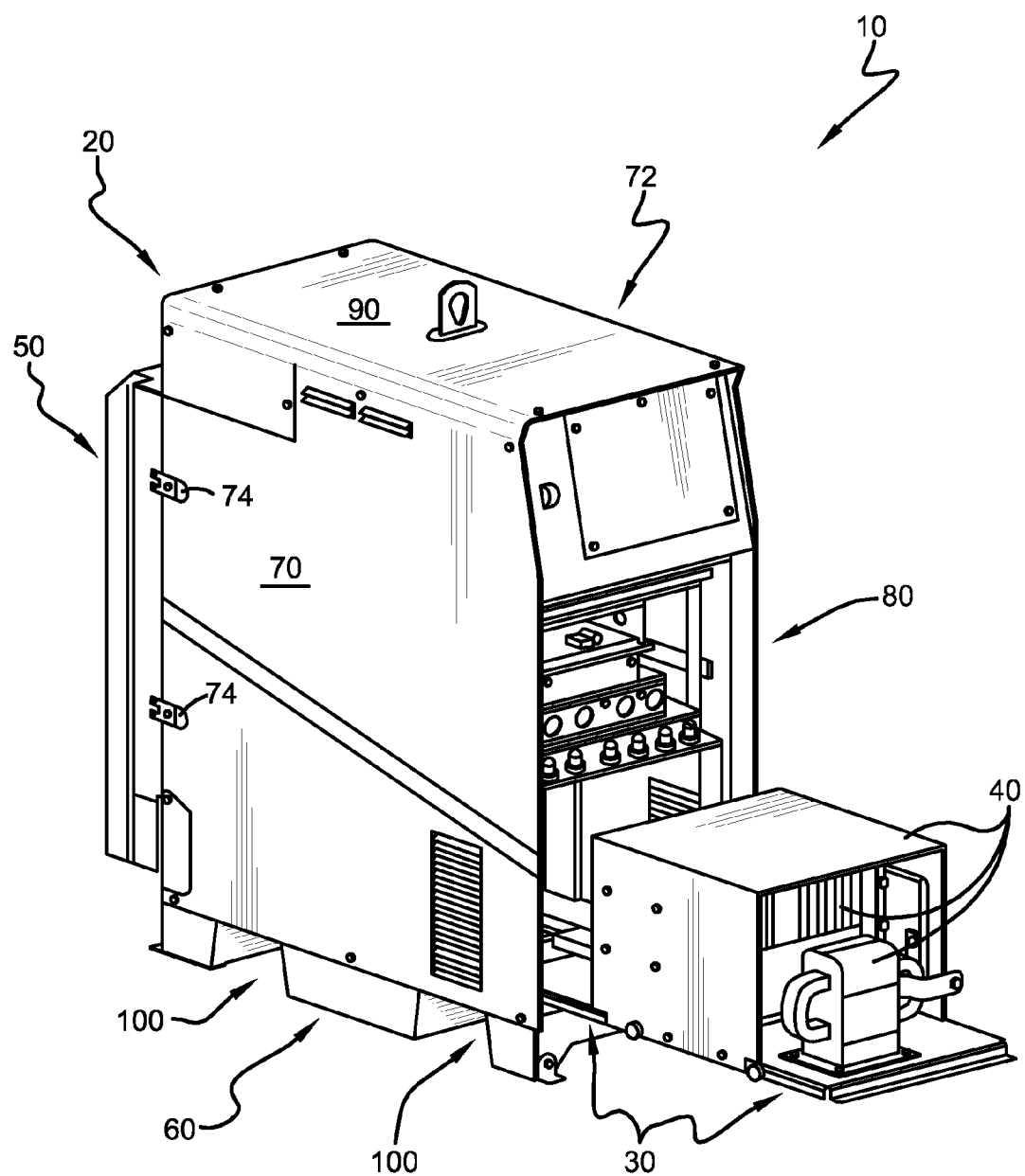
FIG. 5 is a front perspective view of yet a further embodiment of the power supply housing assembly with front cover removed in an open position.

With reference to FIG. 5, in yet a further embodiment, the at least one telescoping track assembly 30 may be bi-directional or uni-directional, thus permitting access to the at least one internal component 40 installed on telescoping track assembly 30 using access panel 50, front panel 80, or a second access panel (not shown) e.g., located on a side of the welding power supply housing assembly 10 opposite access panel 50. For example, the welding power supply housing assembly 10 may have second access panel positioned similarly on front panel 80 or one of the side panels. Here a user may engage the at least one telescoping tracking assembly 30 in a direction outwardly from front panel 80, or second access panel.

With continued reference to FIG. 5, in another non-limiting embodiment, at least one telescoping tracking assembly 30 is installed on a housing for the at least one internal component 40. In this configuration, heavier internal components, i.e. a/c switches, may be slid inward and outward from front panel 80 of welding power supply housing assembly 10 with minimal effort. For example, if an a/c switch for SAW were to cease functioning a user would typically be required to remove the power supply from the mezzanine where the power supply is installed, and then dissemble working components to successfully replace the a/c switch. With the invention disclosed herein, it is no longer necessary to remove functioning components to get to the a/c switch, nor will the user have to move the power supply to a location with more space maintenance the a/c switch. Installing at least one telescoping tracking assembly 30 to the housing of at least one internal component 40, the user is able to access the a/c switch through front panel 80 or second access panel, and with minimal effort disconnect any corresponding wires, and slide the a/c switch outward from welding power supply housing assembly 10, using at least one telescoping tracking assembly 30. After maintenance, the user can easily slide the a/c switch inwardly using at least one telescoping tracking assembly 30 and reconnect the necessary a/c switch wires.

While track assemblies have been described which interface with both the front and rear sides of welding power supplies, there is no need to limit the invention to these locations. It is within the scope of the invention to position rails with ingress and egress through side panels using the methodologies described herein.

Figure 6:
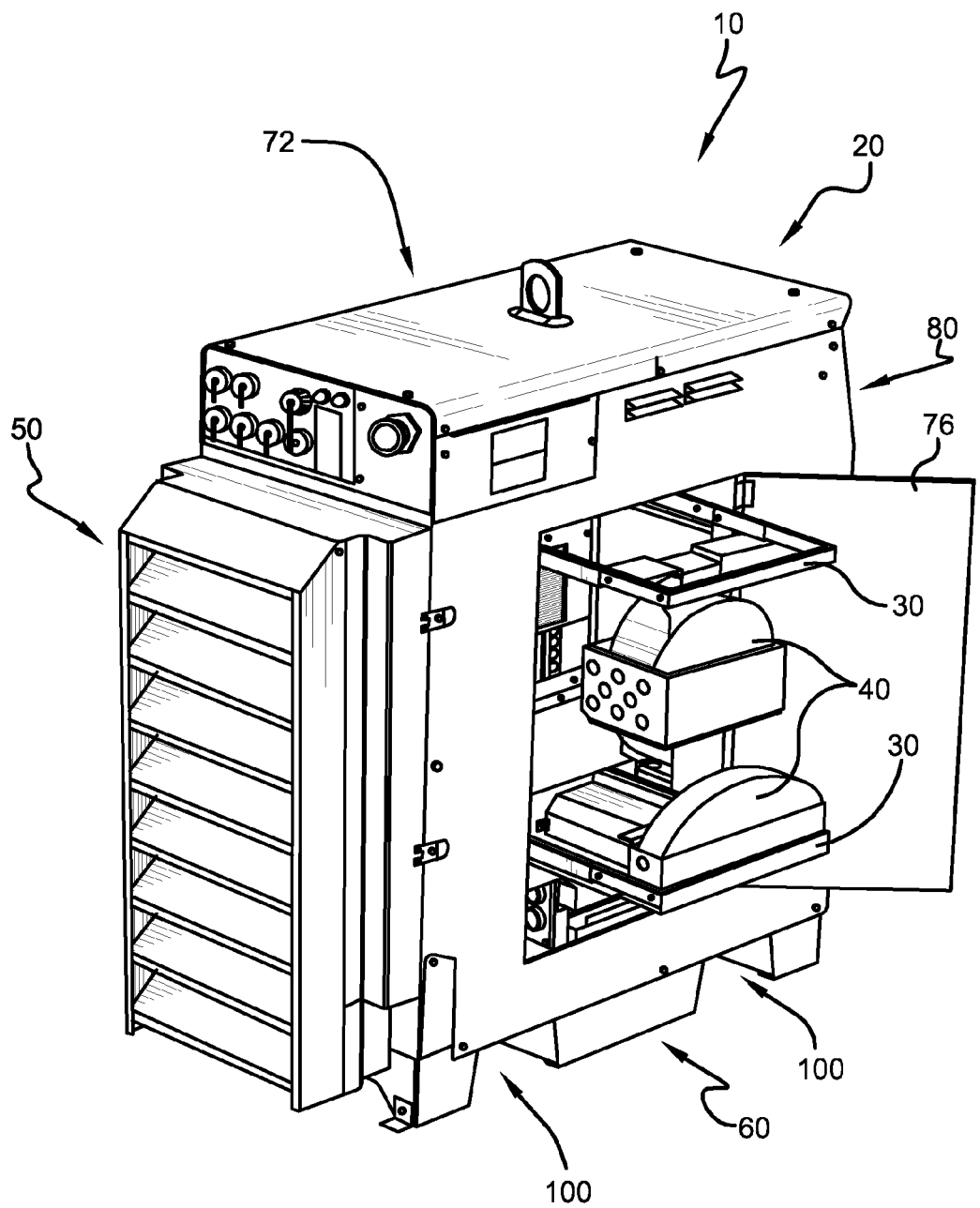
FIG. 6 is a perspective view of yet a further embodiment of the power supply housing assembly having a side access panel pivotally attached.

With reference to FIG. 6, in another non-limiting embodiment, side access panel 76 is pivotally attached to side panel 70. In this embodiment, at least one internal component 40 may be installed on at least one telescoping tracking assembly 30, or alternatively on side access panel 76 of welding power supply housing assembly 10 using the methodologies described herein.

The invention has been described herein with reference to the preferred embodiment. Modifications and alterations will occur to others upon a reading and understanding of this specification. It is intended to include all such modifications and alternations insofar as they come within the scope of the appended claims or the equivalents thereof.

What is claimed is:

1. An electric arc welder power supply having an airflow with contaminants embedded within said airflow, said power supply comprising:
   an essentially hollow housing;
   at least one internal component requiring cooling mounted within said hollow housing;
   at least one cooling component mounted within said hollow housing;
   at least one sliding track assembly within said housing and attached thereto, said sliding track assembly having said at least one cooling component mounted thereupon; and wherein
   said sliding track assembly moves from a first closed position to a second open position which at least partially exposes said at least one cooling component.

2. The welder power supply of claim 1 which further comprises:
   an access panel attached to an end of said track assembly.

3. The welder power supply of claim 1 which further comprises:
   an access panel pivotally attached to a vertical edge of said housing.

4. The welder power supply of claim 1 wherein said sliding track assembly is a telescoping track assembly.

5. The welder power supply of claim 1 wherein said at least one sliding track assembly is a pair of essentially parallel sliding track assemblies.

6. The welder power supply of claim 5 wherein said pair of track assemblies comprises a pair of essentially parallel rails.

7. The welder power supply of claim 5 wherein said pair of sliding track assemblies is at least two pairs of essentially parallel sliding track assemblies.

8. The welder power supply of claim 1 which further comprises:
   at least a second sliding track assembly within said housing and attached thereto, said sliding track assembly moving from a first closed position to a second open position through a front side of said housing.

9. The welder power supply of claim 1 which further comprises:
   at least a second sliding track assembly within said housing and attached thereto, said sliding track assembly moving from a first closed position to a second open position through a lateral side of said housing.

10. An electric arc welder power supply housing having an airflow having contaminants embedded within said airflow, said housing assembly comprising:
    an essentially hollow housing assembly, which at least partially allows airflow therethrough;
    at least one internal component requiring cooling mounted within said housing;
    at least one cooling means mounted within said housing;
    a means for moving said at least one cooling means from a first closed position to a second open position which at least partially exposes said at least one cooling means.

11. The welder power supply of claim 10 which further comprises:
    an access panel attached to an end of said means for moving.

12. The welder power supply of claim 10 which further comprises:
    an access panel pivotally attached to a vertical edge of said housing.

13. The welder power supply of claim 10 wherein said means for moving is a sliding track assembly.

14. The welder power supply of claim 10 wherein said sliding track assembly is a telescoping track assembly.

15. The welder power supply of claim 10 which further comprises:
    a pair of essentially parallel sliding track assemblies.

16. The welder power supply of claim 15 wherein said track assemblies comprises a pair of essentially parallel rails.

17. The welder power supply of claim 15 which further comprises:
    at least two pairs of essentially parallel sliding track assemblies.

18. The welder power supply of claim 10 which further comprises:
    at least a second means for moving within said housing and attached thereto, said second means moving from a first closed position to a second open position through a front side of said housing.

19. The welder power supply of claim 10 which further comprises:
    at least a second means for moving within said housing and attached thereto, said second means moving from a first closed position to a second open position through a lateral side of said housing.

20. A method for accessing and maintaining internal components of an electric arc welding power supply comprising the steps of:

providing a welding power supply housing which allows airflow therethrough;

providing at least one sliding track assembly within said housing and attached thereto, said sliding track assembly having at least one cooling component mounted thereupon; and wherein engaging said sliding track assembly from a first closed position to a second open position which at least partially exposes said at least one cooling component for cleaning thereof.

* * * * *